United States Patent [19]

Riedling

[11] Patent Number: 5,038,751
[45] Date of Patent: Aug. 13, 1991

[54] DIRECT FIRED UNIT HEATER

[76] Inventor: Richard Riedling, 230 N. Ashbrook, Lakeside Park, Ky. 41017

[21] Appl. No.: 543,145

[22] Filed: Jun. 25, 1990

[51] Int. Cl.⁵ .............................................. F24H 3/00
[52] U.S. Cl. ........................... 126/116 A; 126/110 C; 237/50; 431/173
[58] Field of Search ..................... 126/116 A, 110 C; 432/19, 10; 237/50, 53, 70; 431/173

[56] References Cited

U.S. PATENT DOCUMENTS

| | | |
|---|---|---|
| 2,582,331 | 1/1952 | Hoeffken . |
| 3,542,373 | 11/1970 | Dirkes . |
| 4,182,303 | 1/1980 | Muckelrath .................. 126/110 R |
| 4,549,866 | 10/1985 | Granville ........................ 432/110 |
| 4,651,711 | 3/1987 | Velie . |
| 4,767,317 | 8/1988 | Kramer . |
| 4,848,313 | 7/1989 | Velie . |

Primary Examiner—Larry Jones
Attorney, Agent, or Firm—Wood, Herron & Evans

[57] ABSTRACT

The present invention is a direct fired unit heater which includes a lower combustion chamber which communicates with an upper fan assembly which mixes combustion products with ambient air and discharges this laterally from the unit. The fan assembly has two cylindrical fans each with different critical speeds. One motor drives both cylindrical fans and is adjustable so that at a first higher speed it is within the operating range of both fans. At a lower operating speed, it is only within the operating range of the upper cylindrical fan. The upper cylindrical fan acts to pull in room air and discharge this. Thus, the blower operates continuously thereby destratifying the room air. When the burner operates, the motor speed is increased to act within the operating speed of the lower fan assembly. This lower fan assembly thereby pulls in the combustion products and discharges these along with the ambient air. The size of the cylindrical fans are designed to provide appropriate mixing for a direct fired unit. The burner, pilot, thermostat, transformer and gas valves are attached to a chassis which slides within the heater housing and can be easily removed for repair.

13 Claims, 2 Drawing Sheets

DIRECT FIRED UNIT HEATER

BACKGROUND

Large industrial buildings have unique heating requirements. They can be serviced by large central heating facilities or, as frequently is the case, they can be heated by a series of ceiling mounted unit heaters. This is particularly the case with factories and warehouses. Unit heaters eliminate the need for duct work which is expensive and takes up space limiting the utility of the building.

Until now these unit heaters have all been indirect fired units. Indirect fired unit heaters burn fuel in a combustion chamber and the combustion products pass through a plenum and subsequently through a flue to the exterior of the building. The plenum acts as a heat exchanger and heat is drawn off and blown into a room. Unfortunately, these indirect fired units are generally very inefficient. Some are fifty percent efficient or less.

Direct fired units are generally ninety-eight to one-hundred percent efficient. Direct fired units burn fuel in combination with exterior air and the combustion products are discharged directly into the area being heated. Thus, no heat is lost up the flue. Unfortunately, there are no direct fired heaters that are adapted to replace unit heaters. Existing direct fired heaters for factories are large central heaters designed to supply all the heat requirements for the building and requiring duct work.

Since a factory typically incorporates many different unit heaters spaced around the building, when one breaks down it is not economically feasible to replace all the existing unit heaters with one direct fired central heater. Thus, generally with buildings that have indirect fired unit heaters, when one breaks down, they will typically replace it with an indirect fired unit heater.

For various reasons, it is difficult to design a direct fired unit heater. First of all, these must burn outside air. If they burned interior air and discharged the combustion products, the carbon dioxide and carbon monoxide levels would quickly increase until lethal. Further, there are stringent mixing requirements for unit heaters. These must mix at least seventy-five percent interior air with twenty-five percent combustion products. Also, unit heaters must be designed to be supported from the ceiling which adds another difficulty in designing a direct fired unit heater which can be easily serviced. All-in-all, direct fired heaters are generally much more complex than an indirect fired heater.

SUMMARY OF THE INVENTION

The present invention is premised on the realization that a direct fired unit heater can be designed which is simple, inexpensive and designed to be ceiling supported.

It is further premised on the realization that such a unit heater can be designed which can be easily repaired. This can be accomplished by mounting most of the components which can break down on a chassis which slides into the housing of the unit. Thus, the chassis can be removed from the heater to be repaired.

The present invention is further premised on the realization that the mixing requirements for a direct fired unit heater can be met by combining two cylindrical fans mounted to each other and both driven by the same shaft from one motor. Room air can be drawn in by one cylindrical fan and combustion products can be pulled in by the second cylindrical fan. By choosing the appropriate sizes of these fans, the appropriate mixing of the gases can be controlled.

Further, by choosing appropriate cylindrical fans with appropriate blade spacing and relative angular position, the unit heater can act as a constant destratifier. One fan will have a critical operating speed which is higher than the critical operating speed of the other fan. Thus, the motor can be run constantly. If the burner is not operating, it will run at a lower speed, below the critical operating speed of the fan assembly pulling in combustion products. Thus, only room air will be pulled in and discharged. If the burner is operating, the motor will operate at a higher speed which is within the critical range of both fan assemblies and thus both fans will act to pull in room air and combustion products respectively and these will be discharged laterally through the sides of the heater assembly.

Other objects and advantages of the present invention will be appreciated in light of the following detailed descriptions and drawings in which:

DETAILED DESCRIPTION

Figure 1:
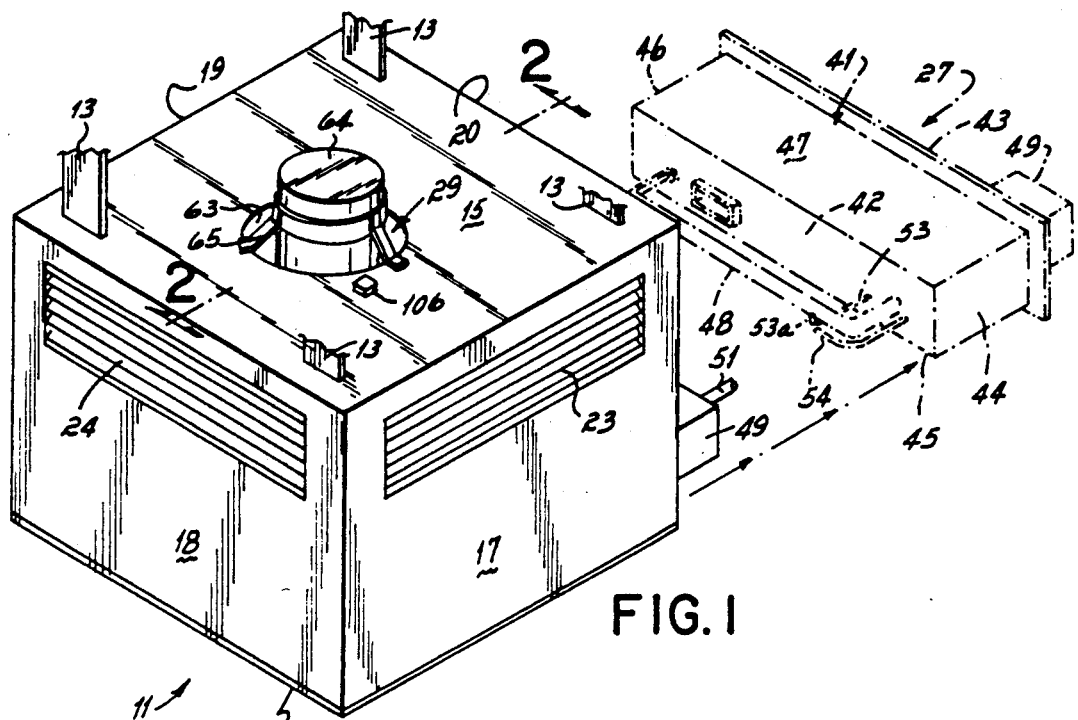
FIG. 1 is a perspective view of the present invention showing, in phantom outline, the removal of the burner chassis.
Figures 5A, 5B:
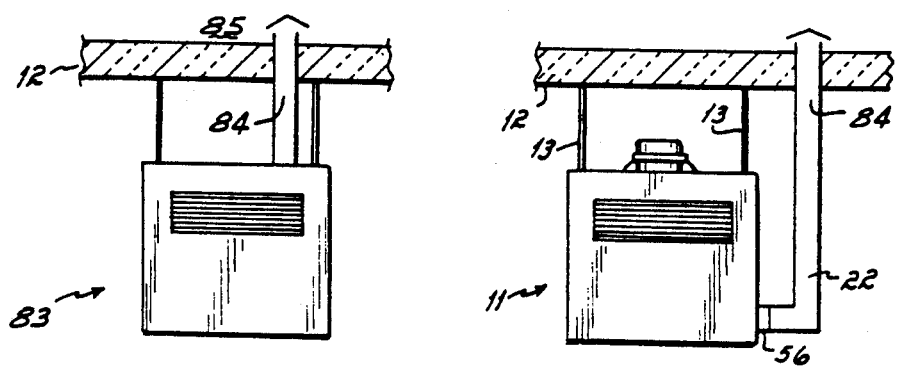
FIGS. 5A and 5B are diagrammatical depictions of the method of replacing an existing indirect fired heater with a direct fired heater according to the present invention.
Figure 2:
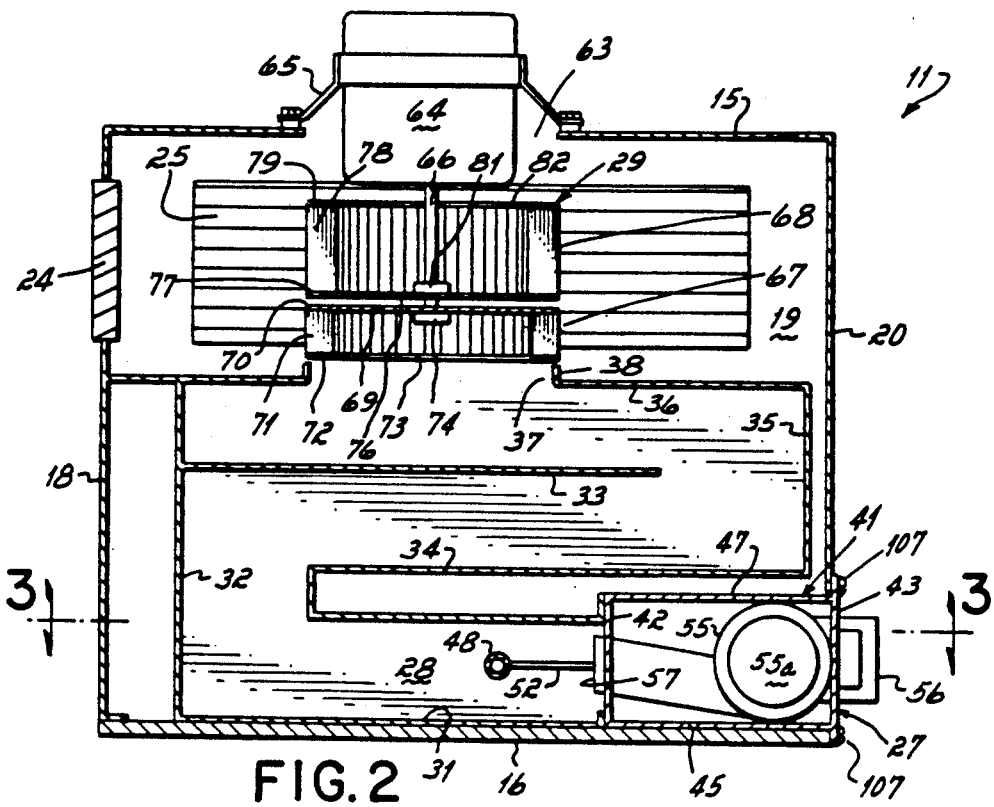
FIG. 2 is a cross-sectional view taken at lines 2—2 of FIG. 1.
Figure 3:
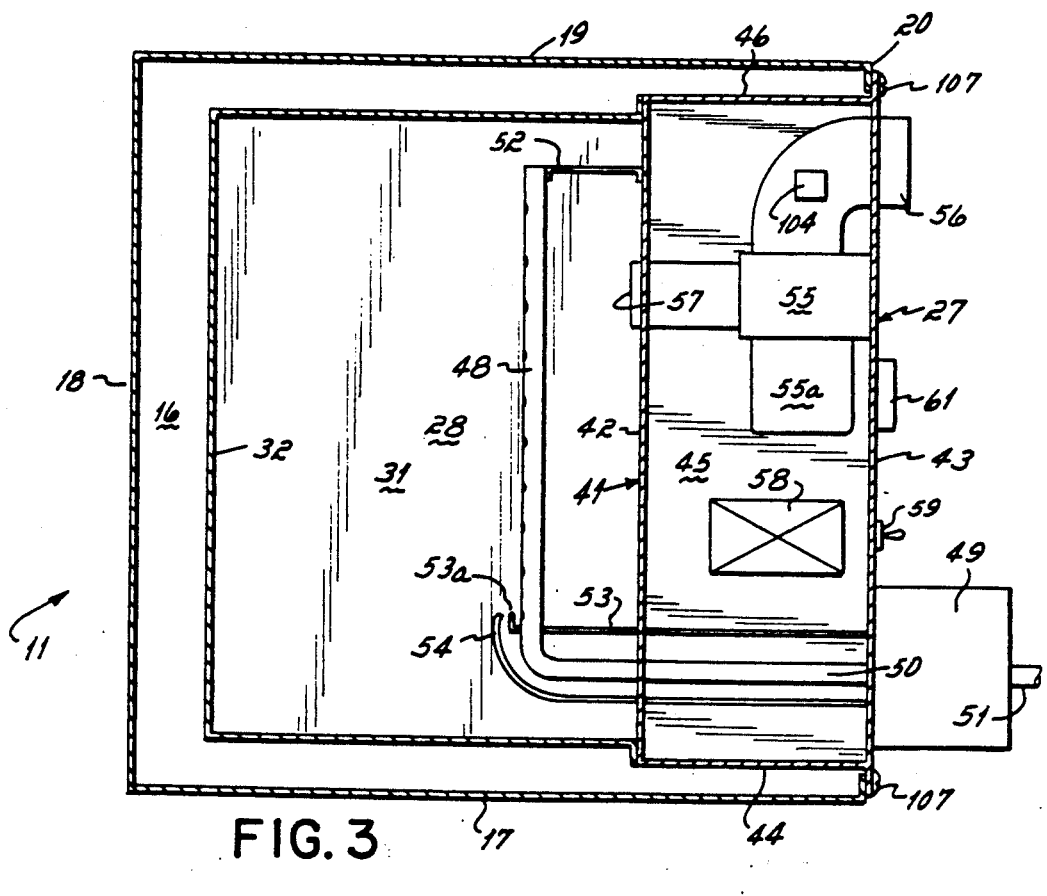
FIG. 3 is a cross-sectional view taken at lines 3—3 of FIG. 2.

As shown in FIGS. 1-3, there is a unit heater 11 which as shown in FIG. 5B is mounted to a ceiling 12 of a building with four mounting straps 13.

The unit heater 11 includes a housing which has a top wall 15, bottom wall 16 and four side walls 17, 18, 19 and 20. As shown in FIG. 5B, the unit heater 11 includes an air inlet conduit 22 which extends from the unit heater through the ceiling 12 to the exterior of the building.

The unit heater 11 also has three air outlets, 23, 24 and 25 which extend through side walls 17-19, respectively.

At the bottom portion of the heater is the burner assembly 27 which is shown removed in phantom in FIG. 1. The burner assembly 27 rests on the bottom wall 16 of the heater housing 14 and extends to the combustion chamber 28. Combustion chamber 28 includes baffling and fire walls which provide a conduit to a fan assembly 29 which is adapted to blow air out through the air outlets 23-25 in side walls 17-19.

Specifically, the combustion chamber 28 includes a bottom metal fire wall 31, an upwardly extending metal wall 32 and baffle plates 33 and 34, rear wall 35 and top wall 36. Top wall 36 includes an opening 37 aligned with the fan assembly 29. A slight lip 38 extends up from the top wall 36 around opening 37 to provide direct communication with the fan assembly.

The burner assembly 27 includes a chassis or subhousing 41. This subhousing 41 includes an interior wall 42, an exterior wall 43, and two side walls 44, 46, a bottom wall 45 and a top wall 47.

The burner assembly 27 incorporates a burner 48 which is connected by gas line 50 to a main gas valve 49 which in turn is connected to a gas inlet line 51. As will be described below, the gas line 50 also connects to an auxiliary or second stage gas valve actuated by a low temperature switch near air inlet 22. Gas line 50 extends from gas valve 49 through the interior wall 42 of the chassis 41 and supports one end of burner 48 in the combustion chamber. Burner 48 is supported at an opposite end by a bracket 52. Burner 48 is preferably a two stage burner. Suitable burners can be purchased. One such burner is the 430 series Steel Deck Burner sold by Burner Systems Intervention which is suitable to produce 50,000 BTU/h of heat.

A pilot line 53 for burner ignition is also located in the combustion chamber slightly forward of the burner 48. Thermocouple 54 is supported next to the igniting area 53a of pilot line 53 to detect the heat from the pilot light 53.

To provide air to the burner 48, there is a burner or inlet fan 55, driven by a motor 55a, which is inside the chassis 41 supported on bottom wall 45. The burner fan 55 has an inlet 56 which communicates with the air inlet conduit 22 at one end and exhausts through opening 57 into the combustion chamber 28.

The chassis 41 also houses a transformer 58 which acts to provide the low voltage for the heater, a main fused on/off switch 59 and a main thermostat 61 on exterior wall 43.

As shown in FIGS. 1 and 2, the chassis 41 simply slides within the housing 14 resting on the bottom wall 16 co-linear with the bottom wall 31 of the combustion chamber 28. The exterior wall 43 of chassis 41 abuts near wall 20 and can be bolted into position holding it in place. As will be described below, this will provide for easy removal of the burner assembly. (Alternately the chassis can be slidably supported by the side walls.)

To provide room air to heater 11, the top wall 15 includes a central opening 63 directly above opening 37 from the combustion chamber. A fan motor 64 mounts to top wall 15 held within opening 63 by a bracket 65 which is bolted at three points to the top wall 15. The motor 64 includes a vertical drive shaft 66 which attaches to and rotates the fan assembly 29.

This fan assembly 29 incorporates a first lower squirrel cage or cylindrical fan 67 and a second or upper squirrel cage or cylindrical fan 68. Lower cylindrical fan 67 comprises a fan disc 69 at its top which includes a peripheral rim 70. A plurality of fan blades 71 extend from the first rim 70 down to a lower rim 72, the lower rims 72 providing an opening inlet 73 directly above opening 37 in top wall 36. The fan disc 69 includes a hub 74 bolted or fixed to the end of the drive shaft 66 of the motor 64.

Similarly, the upper squirrel cage or cylindrical fan 68 has a lower fan disc 76 which has a peripheral rim 77 with plurality of blades 78 extended from the rim 77 up to an upper ring 79. Disc 76 like disc 69 includes a hub 81 bolted or fixed to shaft 66. This upper cylindrical fan 68 has an inlet opening 82 directly beneath the motor 64 to draw air in through the inlet opening 63 around the motor 64. As designed with fan disc 76 facing fan disc 69, the lower fan pulls air only from the combustion chamber and discharges this laterally. Likewise, the upper fan pulls air only through opening 63 and discharges this laterally.

The lower fan 67 has a critical or minimum operating speed which is higher than the minimum operating speed of the upper fan 68. These can be purchased. Preferably the lower fan 67 is a single inlet shaft mounted fan. The assigned rotation is clockwise loading into the fan inlet. Such a fan is sold by Dayton Manufacturing #0913-00-10. The displacement is 0-10 CFM at less than 900 RPM and 250 CFM at 1100 RPM Preferably the upper fan 68 will have single inlet shaft mounted fan with an assigned counterclockwise rotation such as Dayton Manufacturing #0918-00-43. The displacement at destratifying speed (900 RPM) is 800 CFM and about 965 at 1100 RPM.

The size of the fans are also carefully controlled so that when the motor is operating within the operating range of both the fans, i.e., above the minimum operating speed of the lower fan 67, the upper fan 68 will pull in three times as much air as the lower fan 67 providing for a seventy-five/twenty-five mix of room air and combustion air, respectively, being discharged through the discharged ports.

As shown in FIG. 5A and 5B, the heater 11 of the present invention is designed to replace an indirect fired unit heater 83. Thus, as shown in FIGS. 5A and 5B, the indirect fired unit heater 83, which incorporates a flue 84 to direct combustion products to the exterior 85 of a building, is removed from ceiling 12. The direct fired unit 11 of the present invention is then attached to the ceiling 12 with straps 13. The air inlet 22 is attached to the old flue 84 from the indirect fired unit. Thus, where the old flue 84 was previously used to discharge combustion products, it would now be used to pull in outside air for combustion.

Figure 4:
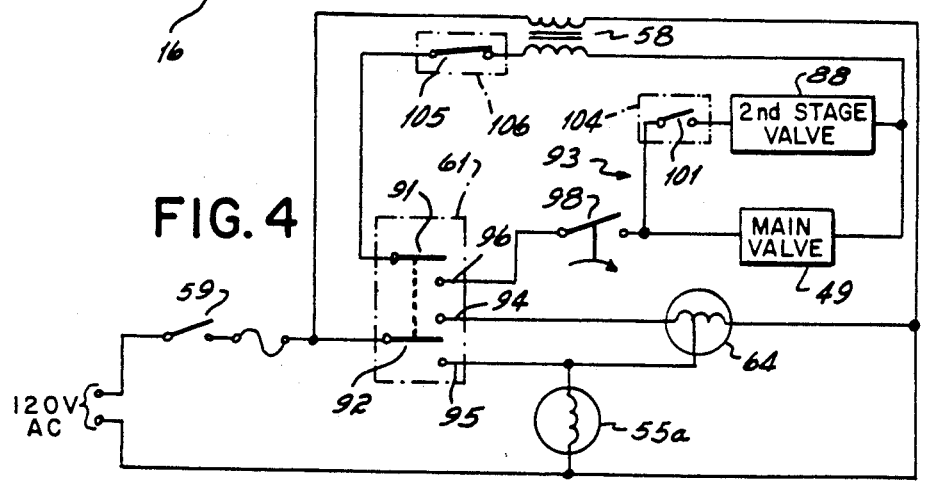
FIG. 4 is a diagrammatical depiction of the circuitry used in the present invention.

The operation of the present invention can be further appreciated by reference to FIG. 4, which is a circuit diagram. In this embodiment, the present invention is operated on 120 volt AC current. The circuit includes the fused main on/off switch 59 and is further operated by the thermostat 61. The main gas valve 49 and second stage valve 88, as well as the thermostat 61, are all controlled by direct current from transformer 58.

The thermostat 61 includes a pair of switches 91 and 92. Switch 91 is either open or closed and when closed completes a circuit to centrifugal switch 98 which, when closed, actuates the gas valve control circuit 93. Switch 92, which operates in unison with switch 91, controls fan motor 64 and air intake motor 55a. When switch 92 contacts lead 94, circulation motor 64 operates at low speed and motor 55a is off. When switch 92 contacts lead 95, motor 64 operates at high speed and motor 55a is on.

When switch 92 contacts lead 94, switch 91 will be in an off position. When switch 92 contacts lead 95, switch 91 will contact lead 96 and actuate the gas valve circuit 93. Between lead 96 and main gas valve 49 is a centrifugal switch 98 which is positioned on combustion air motor 55a. When the combustion air motor 55a rotates, switch 98 is closed.

The gas valve circuit 93 includes the centrifugal switch 98 to open main gas valve 49 and a switch 101 of thermostat 104 to open second stage valve 88. When switches 91 and 92 are closed, the main gas valve 49 is open causing gas to flow to the burner.

Second stage gas valve 88 is controlled by the switch 101 which closes when the second thermostat 104, located in air inlet 56, senses very cold incoming air, i.e., less than 20° F. When the incoming air is this cold, switch 101 will close causing second stage valve 88 to open and causing additional gas to flow to the burner.

The gas valve circuit can be shut off by a high temperature limit switch 105 having a sensor 106 which is located in an upper portion of the heater 11 near the fan assembly 29.

In operation, when the main on/off switch 59 is in the on position and the thermostat 61 in the off position, thermostat switch 92 will contact lead 94 causing the circulation motor 64 to operate at a low speed. At this low speed, the lower cylindrical fan 67 will not be blowing air nor will it be sucking in air from the combustion chamber. The speed at which it will be rotating will be below its critical speed. However, this is within the operating range of the upper fan 68. Thus, it will be pulling in air from the top of the heater and discharging it through the lateral vent ports 23-25. This acts to pull warm air from the ceiling and blow this down towards the floor and acts to destratify the air reducing heat loss through the ceiling.

When the thermostat switch goes to the on position, switch 91 contacts lead 96 in preparation to actuate the gas valve circuit 93. Switch 92 will also contact lead 95 actuating combustion motor 55a and actuating the fan motor 64 at the high speed. Rotation of the combustion air motor 55a will cause the centrifugal switch 98 to close which will open the main gas valve via the switch 91 and lead 96. With the main gas valve open, the pilot light will ignite the gas committed through the burner.

The combustion air motor 55a will cause fan 55 to pull air through duct 22 and introduce it in to the combustion chamber 28. The circulation motor 64 will operate at a high speed causing lower fan 67 to pull heated air from the combustion chamber. This will be mixed with the air pulled in from the surrounding room by the upper cylindrical fan 68 and the products will be discharged together. Due to the sizing of the respective fans 67, 68, a seventy-five/twenty-five mix can be accomplished.

As shown in FIG. 4, second stage gas valve 88 which will add additional gas to the burner when needed. Specifically, sensor 104 located in inlet conduit 56 will detect the temperature f incoming air. When the temperature of this air reaches a certain low temperature (i.e., less than 20° F.), the second stage valve 88 will be activated through closing of switch 101 adding additional gas to make up for the cold exterior air that is being burned.

In the event any of the burner 48, transformer 58, main valve 49, secondary stage valve 88, combustion air motor 55, or thermostat 61 should break down preventing the unit from properly functioning the burner assembly 27 can be removed to repair the defective part. By removing bolts 107 and disconnecting the gas line 51, the entire burner assembly chassis 41 can be separated from the heat. Plug in connections (not shown) are provided for the circulation motor upstream of the thermostat switch and for the high temperature limit switch to provide for complete separation of the burner assembly 27 from the heater 11. This unit can then be repaired and put back into service without significant down tome. A temporary replacement burner assembly can also be inserted to avoid any down time. These units, after a period of use, can also be reconstructed by replacing the burner assemblies along with the circulation motor to totally reconstruct the entire unit without removing it from the ceiling The present invention provides many unique advantages. By using the flue from an old indirect fired unit heater as the air intake for the present invention, it provides a simple method to replace existing indirect fired units. Further, the positioning of the fan assembly provides for destratification of the air. It pulls in air from the top and discharges it downwardly from lateral ports. Also, due to the back to back configuration of the fan discs of the cylindrical fan wheels, and the use of a variable speed motor, destratification can occur continuously even when the heater is not generating heat. The fan assembly also provides for proper mixing of room air to combustion product.

Finally, with the burner assembly mounted within and on a single chassis which slides within the housing of the heater, repair of the unit is facilitated. This is of particular importance since these units are ceiling mounted making it difficult to work on these.

The preceding has been a description of the present invention along with the best mode currently known of practicing the invention.

However, the invention should only be defined by the appended claims wherein I claim:

1. A method of replacing an indirect fired unit heater attached to a ceiling of a building with a direct fired unit heater wherein said indirect fired unit heater includes a flue extending to an exterior of said building to discharge combustion products to the exterior of said building, said method comprising:
   disconnecting said indirect fired unit heater from said flue and separating it from said ceiling;
   mounting in its place said direct fired unit heater said direct fired unit heater having an air inlet;
   attaching said air inlet to said flue whereby combustion air for said direct fired unit can be drawn in from the exterior of said building through said flue.

2. The method claimed in claim 1 further comprising forcing air with a fan through said flue and said air inlet.

3. A direct fired unit heater having a top and a bottom and a plurality sides, said top having an air inlet to direct room air into said heater said air inlet communicating with a fan assembly in a center portion of said heater;
   said bottom having a combustion chamber adapted to burn a fuel thereby creating heated combustion products;
   said combustion chamber communicating with said fan assembly;
   said fan assembly having a single motor adapted to proportionately mix air from said air inlet with heated combustion products from said combustion chamber and discharge these through at least one outlet in one of said sides, wherein said fan assembly includes a first fan with an opening communicating with said combustion chamber;
   a second fan with an opening communicating with said air inlet;
   whereby said first and second fans mix and discharge heated combustion products and room air through said outlet.

4. The direct fired unit heater claimed in claim 3 wherein said top has said air inlet and wherein said heater comprises four side walls with at least two discharge outlet.

5. The direct fired unit claimed in claim 3 wherein said first fan has a minimum operating speed and second fan has a minimum operating speed and said second fan has a minimum operating speed wherein the minimum operating speed of said first fan is higher than the minimum operating speed of said second fan wherein said two fans are driven by a two speed motor the first speed effective to rotate said fans above the minimum operating speed of said first fan and said second speed being effective to rotate said fans at a speed above the minimum operating speed of said second fan and below the minimum operating speed of said first fan.

6. The unit heater claimed in claim 3 further comprising a heater housing and a burner assembly said burner assembly comprising a chassis separate from said heater housing said chassis supporting:
- a combustion air inlet;
- a combustion air inlet motor;
- a fuel inlet,
- a fuel control valve,
- a burner,
- a pilot light, and
- a transformer whereby said chassis can be slid into and out of said heater housing to provide for simple repair of said heater.

7. A direct fired unit heater having a housing including a top and bottom and four side walls;
- an air inlet through said top extending to a fan assembly;
- a combustion chamber in a bottom of said heater having a baffled chamber extending to said fan assembly;
- said fan assembly adapted to pull room air from said air inlet and combustion products from said combustion chamber and discharge these through a plurality of openings in said side wall;
- a chassis slidably supported within said housing said chassis supporting a burner and a gas valve.

8. A direct fired unit heater as claimed in claim 7 wherein said chassis supports a thermostat adapted to control the operation of said burner.

9. The direct fired unit heater claimed in claim 8 wherein said chassis further supplies a pilot and a pilot light fuel valve.

10. The direct fired unit heater claimed in claim 7 wherein said chassis further supports a transformer and an on/off switch controlling said unit heater.

11. The direct fired unit claimed in claim 10 wherein said chassis supports an air inlet adapted to be connected to the exterior of a building and a inlet combustion air motor adapted to pull air in from said air inlet and discharge said air at said burner.

12. A direct fired unit heater having an air inlet, a fan assembly and a combustion chamber adapted to burn a fuel thereby creating heated combustion products;
- said combustion chamber communicating with said fan assembly;
- said fan assembly having a first fan communicating with said air inlet and having a second fan communicating with said combustion chamber wherein said fan assembly has a single motor and is adapted to proportionately mix air from said air inlet with heated combustion products from said combustion chamber and discharge these from the unit heater.

13. The direct fired unit heater claimed in claim 12 wherein said first fan has a minimum operating speed and said second fan has a minimum operating speed and wherein the minimum operating speed of said first fan is higher than the minimum operating speed and wherein said motor is a two-speed motor, the first speed being above the minimum operating speed of said first fan and said second speed being above the minimum operating speed of said second fan and below the minimum operating speed of said first fan.

* * * * *